United States Patent
Mousa et al.

(10) Patent No.: US 12,411,257 B1
(45) Date of Patent: *Sep. 9, 2025

(54) METHOD FOR LOCATING A HYDROCARBON-CONTAINING GEOLOGIC FORMATION AND EXTRACTING OIL AND/OR GAS

(71) Applicant: KING FAHD UNIVERSITY OF PETROLEUM AND MINERALS, Dhahran (SA)

(72) Inventors: Wail A. Mousa, Dhahran (SA); Ahmed Abdelmoniem Mohamed Elmak, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/207,469

(22) Filed: May 14, 2025

Related U.S. Application Data

(63) Continuation of application No. 18/747,006, filed on Jun. 18, 2024, now Pat. No. 12,320,938.

(51) Int. Cl.
 *G01V 1/30* (2006.01)
(52) U.S. Cl.
 CPC ............ *G01V 1/30* (2013.01); *G01V 2210/41* (2013.01)

(58) Field of Classification Search
 None
 See application file for complete search history.

(56) References Cited

U.S. PATENT DOCUMENTS

| | | | |
|---|---|---|---|
| 12,320,938 B1 * | 6/2025 | Mousa | G01V 1/30 |
| 2011/0093203 A1 | 4/2011 | Wang | |
| 2014/0219054 A1 * | 8/2014 | Mousa | G01V 1/36 367/43 |

FOREIGN PATENT DOCUMENTS

| | | |
|---|---|---|
| CN | 105204065 B | 10/2017 |
| CN | 110673208 B | 1/2021 |
| KR | 10-2512123 B1 | 3/2023 |

* cited by examiner

*Primary Examiner* — Walter L Lindsay, Jr.
*Assistant Examiner* — Geoffrey T Evans
(74) *Attorney, Agent, or Firm* — Oblon, McClelland, Maier & Neustadt, L.L.P.

(57) ABSTRACT

A method for first arrival picking of seismic data includes receiving a seismic shot record data set from a seismic event, extracting texture features from the seismic shot record data set, calculating an energy ratio matrix from the seismic shot record data set, using fuzzy c-means to cluster the texture features into a strong linear cluster, a moderate linear cluster, and a random noise cluster, calculating a first arrival class matrix from the moderate linear cluster, multiplying the first arrival class matrix by the energy ratio matrix to obtain a first arrival pick matrix, and identifying first arrival picks from the first arrival pick matrix.

8 Claims, 13 Drawing Sheets

METHOD FOR LOCATING A HYDROCARBON-CONTAINING GEOLOGIC FORMATION AND EXTRACTING OIL AND/OR GAS

CROSS-REFERENCE TO RELATED APPLICATIONS

The present application is a Continuation of U.S. application Ser. No. 18/747,006, now allowed, having a filing date of Jun. 18, 2024.

STATEMENT OF PRIOR DISCLOSURE BY AN INVENTOR

Aspects of this technology are described in "A First-Arrival Picking Technique Based on Texture Segmentation Exploring Seismic Data", Published in IEEE Geoscience and Remote Sensing Letters, vol. 20, pp. 1-5, 2023, Art no. 7503805, which is also incorporated herein by reference in its entirety.

STATEMENT OF ACKNOWLEDGEMENT

Support provided by King Fahd University of Petroleum and Mineral (KFUPM) is gratefully acknowledged.

BACKGROUND

Technical Field

The present disclosure is directed to a method for the first arrival picking of seismic data.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Growing energy demand has led to an increase in interest in the petroleum industry for fossil fuels. The petroleum industry has long been using seismic data analysis and processing to study geology and extract oil and gas. This increased demand has propelled advancements in exploration, data acquisition, and computing technologies, leading to the acquisition of massive amounts of seismic data. Conventional seismic data processing techniques are complex and expensive, requiring significant efforts to extract useful information from the growing number of recorded seismic datasets. Among these techniques, picking out the first arriving seismic energy from direct waves and/or refracted head waves is known as first-arrival picking. Conventionally, manual picking was necessary, requiring significant human effort and decision making.

Picking the first arrival on many traces of many shot records is time-consuming and, occasionally, results in inaccurate picks. Efforts have been made to automate (or semi-automate) the picking process, where the machine picks according to defined criteria. Such techniques are more efficient than manual picking but may lead to false picking. Attempts have been made to semi-automatically pick the first arrivals (FAs) directly from the space-time domain records, using preprocessing steps such as filtering followed by computing the energy ratio (ER) and then picking the FAs based on the computed ERs. Machine learning techniques and reinforcement learning techniques are now being used for processing shot records. Because the seismic shot itself gathers amplitude and depicts overall seismic events as a texture image, segmenting the image may help in the picking of FAs. Moreover, while the idea of using image segmentation for seismic data has been applied to seismic image interpretation, is has been so applied particularly for seismic attributes, as the initial step in the seismic interpretation process. These conventional techniques do not allow for automation of first-arrival picking or reduction in errors thereof.

Accordingly, it is one object of the present disclosure to provide a method for the first arrival picking of seismic data.

SUMMARY

In an exemplary embodiment, a method for the first arrival picking of seismic data is described. The method includes receiving a seismic shot record data set from a seismic event. The method also includes calculating from the seismic shot record data set a plurality of descriptors. The method also includes grouping the seismic shot record data set into a plurality of first arrival clusters with fuzzy c-means and at least one descriptor. The method also includes identifying first arrival picks from the plurality of first arrival clusters.

In another exemplary embodiment, a method for the first arrival picking of seismic data is described. The method includes receiving a seismic shot record data set from a seismic event, the method also includes extracting texture features from the seismic shot record data set. The method also includes calculating an energy ratio matrix from the seismic shot record data set. The method also includes using fuzzy c-means to cluster the texture features into a strong linear cluster, a moderate linear cluster, and a random noise cluster. The method also includes calculating a first arrival class matrix from the moderate linear cluster. The method also includes multiplying the first arrival class matrix by the energy ratio matrix to obtain a first arrival pick matrix. The method also includes identifying first arrival picks from the first arrival pick matrix.

In yet another exemplary embodiment, a method for first arrival picking of seismic data is described. The method includes receiving a seismic shot record data set from a seismic event. The method also includes calculating from the seismic shot record data set a plurality of descriptors, the plurality of descriptors including a mean, a second difference moment, a reversed second difference moment, an energy, a contrast variance, and a mode. The method also includes grouping the seismic shot record data set into a plurality of first arrival clusters with a fuzzy c-means and the plurality of descriptors. The method also includes enhancing the plurality of first arrival clusters by multiplying the plurality of first arrival clusters with an energy ratio, the energy ratio being calculated from an industrial energy ratio procedure. The method also includes identifying first arrival picks from the plurality of enhanced first arrival clusters.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
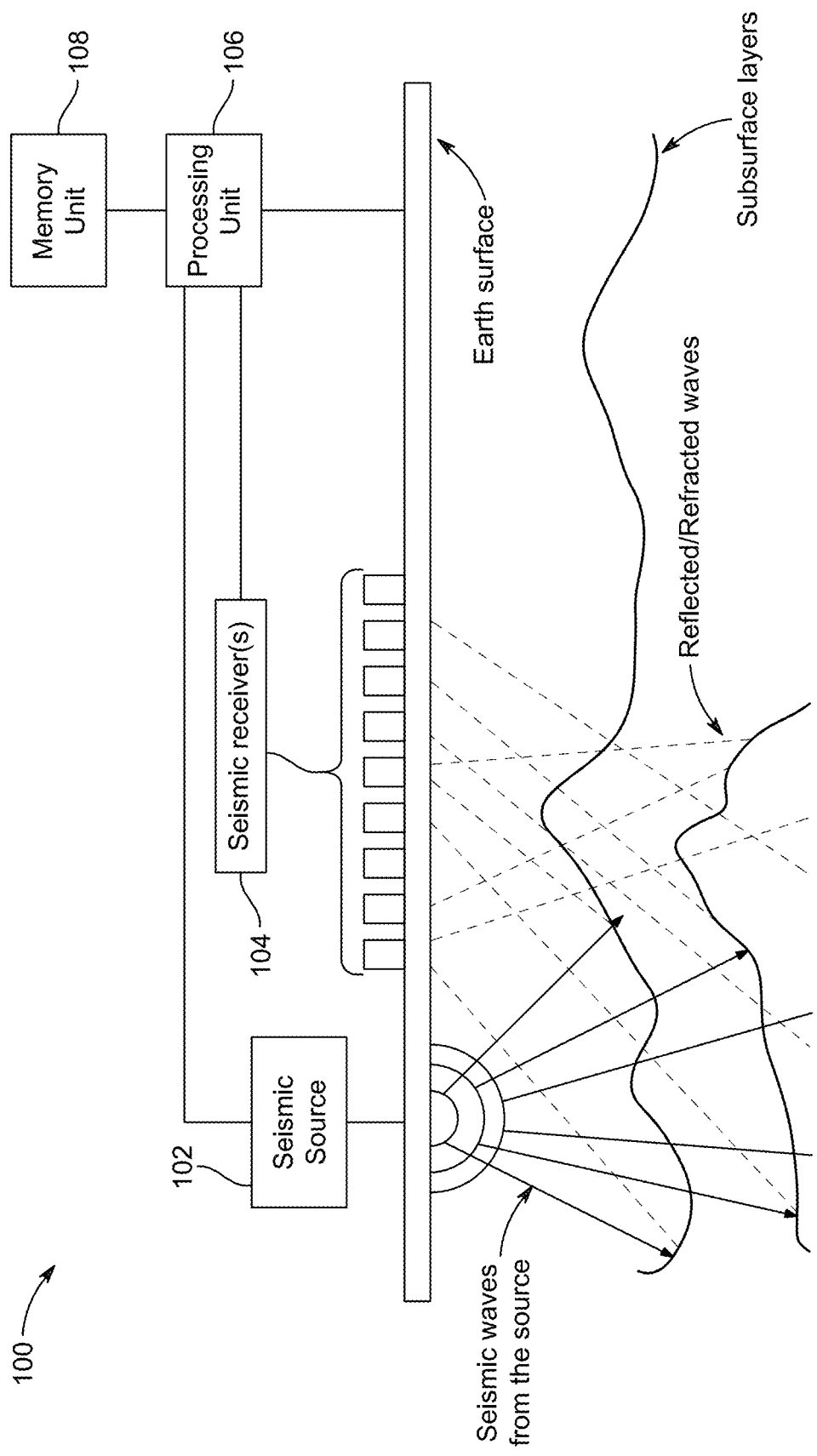
FIG. 1A illustrates a system for seismic data analysis, according to an embodiment of the present disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about" and similar terms generally refer to ranges that include the identified value within a margin of 20%, 10%, or preferably 5%, and any values therebetween.

According to an embodiment, seismic horizons are visually recognizable by a human because horizons have a significant magnitude in comparison to background. Consequently, horizons can be viewed as boundaries with robust appearance when graphed. The magnitudes of horizons may be comparable to or differ dramatically from one another, however, seismic horizons are always observable relative to ambient noise. First arrivals (FAs) in many circumstances have a weaker magnitude than ground roll. FAs have linear properties but a poorer overall appearance than ground roll when graphed. The present disclosure uses aspects of segmenting seismic shot for texture-based segmentation (TBS), to perform first arrival (FA) picking. To do so, a few descriptors may be used to extract texture-discriminating features from the data, the data is then processed by fuzzy c-means (FCM) to cluster the FAs, recognizing FAs as a segment by themselves and other recorded seismic energy. After clustering, the FA segmented image may be multiplied by the shot record energy ratio (ER) image to enhance the picks. The method of the present technology was tested on one synthetic and two real seismic shot records, achieving a pick accuracy of more than 99 percent (%) for the synthetic data set with a noise level of 10%, and more than 80% for the real seismic shot records. All tests were within an absolute error tolerance of ±20 milliseconds (ms). Additionally, the picks of the present disclosure were more accurate than the picks of the standard industrial automatic picking method known as Coppen's industrial automatic picking method, and the semi-auto POCS segmentation picking technique by approximately 28.98%.

The spatial arrangement of shot points is considered, and the core concept of windowing is used to ensure that a texture pattern exists and can be identified. Finding a sense of connection between each shot point and its neighbors is increasingly important. The methods utilized here to capture this relationship depend on descriptors. To precisely recognize FAs, descriptors must be carefully chosen. The FA clearly appear as a line with a zero-intercept when the source and receiver are inline, with the exception of when measurements are taken in the presence of relatively close near-surface geological irregularities. This demonstrates that FA shot points typically exhibit a certain degree of time-distance linearity, which must be accounted for by the descriptors that are specified.

The use of six statistical descriptors is presented, namely, the mean, second difference moment (SDM), the reversed SDM (RSDM), energy, contrast variance, and mode. For texture image segmentation, extraction methods of statistical features are used, as they can capture micro-texture details. This is preferable for segmenting seismic images considering that seismic horizons only occupy a tiny portion of the shot record. Now, with $g(n_t, n_x)$ a time distance shot record, where $n_t$ and $n_x$ symbolize temporal and spatial sampling intervals, respectively. $N_x$ and $N_x$ are denoted as the temporal and spatial sliding window lengths with $n_{xd}$ and $n_{td}$ referring to its central shot point spatial and temporal coordinates. Hence, the following descriptors are used for segmenting the FAs including mean, SDM, RSDM, energy, contrast variance, and mode. Mean is the most widely used statistical measure and as a descriptor this property may distinguish between strong and weak seismic events. The mean is calculated by dividing the total number of values in a window by the window size. Hence, the mean feature can be computed as:

$$g_{d_1}(n_{td}, n_{xd}) = \frac{1}{N_x N_t} \sum_{n_t=n_{td}-\frac{N_t}{2}}^{n_{td}+\frac{N_t}{2}} \sum_{n_x=n_{xd}+\frac{N_x}{2}}^{n_{xd}+\frac{N_x}{2}} g(n_t, n_x). \quad (1)$$

The SDM feature uses diagonal shot points, while suppressing non-diagonal shot points. When the high shot points of a window occur near the main diagonal (e.g., FA), it has a large value. The SDM feature image is given by equation (2):

$$g_{d_2}(n_{td}, n_{xd}) = \frac{1}{N_x N_t} \sum_{n_t=n_{td}-\frac{N_t}{2}}^{n_{td}+\frac{N_t}{2}} \sum_{n_x=n_{xd}+\frac{N_x}{2}}^{n_{xd}+\frac{N_x}{2}} g^2(n_t, n_x)\psi(n_t, n_x). \quad (2)$$

$$\psi(n_t, n_x) = \begin{cases} 1, & \text{if } n_t = n_x \\ 0, & \text{if } n_t \neq n_x \end{cases}. \quad (3)$$

In seismology, the second moment is useful for distinguishing non-linear from linear events. This descriptor also aids in differentiating between tremendous strength linear events (e.g., ground roll) and slightly weaker linear events (e.g., FA). Despite being a key descriptor in the present strategy, SDM is quite sensitive and the disappearance of one shot point drastically changes its value. Therefore, additional descriptors that encompass the entire sub-shot record must be used in combination with SDM.

RSDM discriminates between non-linear and linear occurrences previously described in the SDM. This descriptor provides the additional benefit of assisting in the identification of left-to-right linear events from right-to-left linear events. The RSDM descriptor can be obtained using the following formula:

$$g_{d_3}(n_{td}, n_{xd}) = \frac{1}{N_x N_t} \sum_{n_t=n_{td}-\frac{N_t}{2}}^{n_{td}+\frac{N_t}{2}} \sum_{n_x=n_{xd}+\frac{N_x}{2}}^{n_{xd}+\frac{N_x}{2}} \gamma(g^2(n_t, n_x))\psi(n_t, n_x). \quad (4)$$

where γ operation flips the data $g(n_t, n_x)$ from right to left.

The energy descriptor measures and expresses the total energy of shot points in a window. It adds another layer of separation between strong and weak events and can be determined by the following formula:

$$g_{d_4}(n_{td}, n_{xd}) = \frac{1}{N_x N_t} \sum_{n_t=n_{td}-\frac{N_t}{2}}^{n_{td}+\frac{N_t}{2}} \sum_{n_x=n_{xd}+\frac{N_x}{2}}^{n_{xd}+\frac{N_x}{2}} g^2(n_t, n_x). \quad (5)$$

This feature ignores polarity because the polarity of seismic points might fluctuate dramatically within a trace, potentially canceling certain points in the mean calculation. As a result, there is a clearer distinction between strong and weak events when the energy feature is deployed.

A degree of disparity between the minimum and maximum tones of an image is known as contrast variance. In seismic displaying convention, the contrast variance is referred to as the difference between the strongest (maximum) and weakest (minimum) shot points within a window. This feature can be calculated by equation (6):

$$g_{d_5}(n_{td}, n_{xd}) = g_{max}(n_{td}, n_{xd}) - g_{min}(n_{td}, n_{xd}). \quad (6)$$

Where:

$$g_{max}(n_{td}, n_{xd}) = \max\left(g\left(n_{td} \pm \frac{N_t}{2}, n_{xd} \pm \frac{N_x}{2}\right)\right),$$

and $$g_{min}(n_{td}, n_{xd}) = \min\left(g\left(n_{td} \pm \frac{N_t}{2}, n_{xd} \pm \frac{N_x}{2}\right)\right).$$

The mode descriptor captures the most frequently occurring shot point in a window. By counting the number of times each shot point appears in the set of data, with and the most frequent being the mode.

$$g_{d_6}(n_{td}, n_{xd}) = \max_{occurances}\left(g\left(n_{td} \pm \frac{N_t}{2}, n_{xd} \pm \frac{N_x}{2}\right)\right). \quad (7)$$

This feature grabs the most frequent events but requires the use of small windows. Mode distinguishes between locations with a high concentration of zero value shot points and locations without those values. However, this holds true if the window size is relatively small or large.

After descriptors are computed, their values are distributed uniformly between 0 and 1 to accelerate the segmentation convergence. The features matrix is then configured, and each descriptor is resized to accommodate a single column. Subsequently, the classifier receives the features matrix of the six descriptors (mainly targeting three clusters) and accordingly categorizes each shot point relying on its linearity. The classifier employed in the present method for texture segmentation is FCM. The FCM algorithm is a clustering method that permits a shot point to be a member of multiple clusters with a level of membership. It employs a distance measure to assess the similarity between shot points and cluster centroids, refining the centroids and membership degrees in an iterative process until convergence is achieved. FCM has an additional benefit that renders it more appropriate for segmenting seismic images, namely the capability to handle uneven segmentation of data sets, which is well-suited for seismic segmentation since seismic events only occupy a small portion of the image. The process of segmentation concludes once every shot point has been allocated to the cluster with the highest membership and the next step is to look for the FA cluster. To determine the FA class, a middle-featured class is selected.

FIG. 1A illustrates a system 100 for seismic data analysis, according to an embodiment of the present disclosure. The system 100 includes a seismic source 102, seismic receiver(s) 104 and a processing unit 106.

The seismic source 102 may comprise a seismic source device that generates and transmits seismic waves into the subsurface of the Earth. The seismic source device serves as an artificial generator of seismic waves, and the other features of the disclosed invention would function identically if the seismic source 102 was omitted and the seismic waves were generated by natural sources such as the motion of tectonic plates. The seismic receiver(s) 104 may be device(s) configure to receive reflected and/or refracted seismic waves. In examples, seismic receiver(s) 104 may be configured to sense and record seismic signals that are not generated by the seismic source 102. In one example implementation, the seismic source 102 and the seismic receiver 104 may be implemented as a single unit. In another example implementation, the seismic source 102 and the seismic receiver(s) 104 may be implemented as separate units (as shown). In an example, the receiver may be a geophone. In another example, the receiver is a hydrophone.

The apparatus 100 may include, inter alia, a processing unit 106. According to an embodiment, the processing unit 106 may be a single processing unit or more than one processing unit. The processing unit 106 may be implemented as one or more microprocessors, microcomputers, digital signal processors, central processing units, state machines, logic circuitries, and/or any devices that manipulate signals based on operational instructions. Among other capabilities, the processing unit 106 may be configured to fetch and execute computer-readable instructions stored in a memory (108). Functions of the various elements shown in FIG. 1A, including functional blocks labeled as "processing unit 104", may be provided through the use of dedicated hardware as well as hardware capable of executing software. The processor may be embodied as a single dedicated processor, a single shared processor, a plurality of individual processors among which a few may be shared or a machine having a multi-core GPU, e.g. Nvidia Titan GPU with 6 GB of video RAM. Moreover, explicit use of the term "processing unit" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage, or any other hardware known to a person skilled in the art.

The memory 108 may be coupled to the processing unit 106 and configured to support the processing unit 106 in data and memory operations. The memory 108 may include any computer-readable medium known in the art including, for example, volatile memory, such as Static Random Access Memory (SRAM) and Dynamic Random Access Memory (DRAM), and/or non-volatile memory, such as Read Only Memory (ROM), Erasable Programmable ROMs (EPROMs), flash memories, hard disks, optical disks, and magnetic tapes, or any other memory known to a person skilled in the art. The processing unit 106 may be configured to process the reflected and the refracted seismic to generate seismic shot record data. The processing unit 106 processes the seismic shot record data to capture a first arrival (FA). There may be two types of seismic waves: P-waves (primary or compressional waves) and S-waves (secondary or shear waves). The FA is primarily related to the arrival of P-waves, which are the fastest seismic waves and have the ability to travel through both solids and liquids. S-waves, on the other hand, arrive after P-waves and can only travel through solids.

Figure 1B:
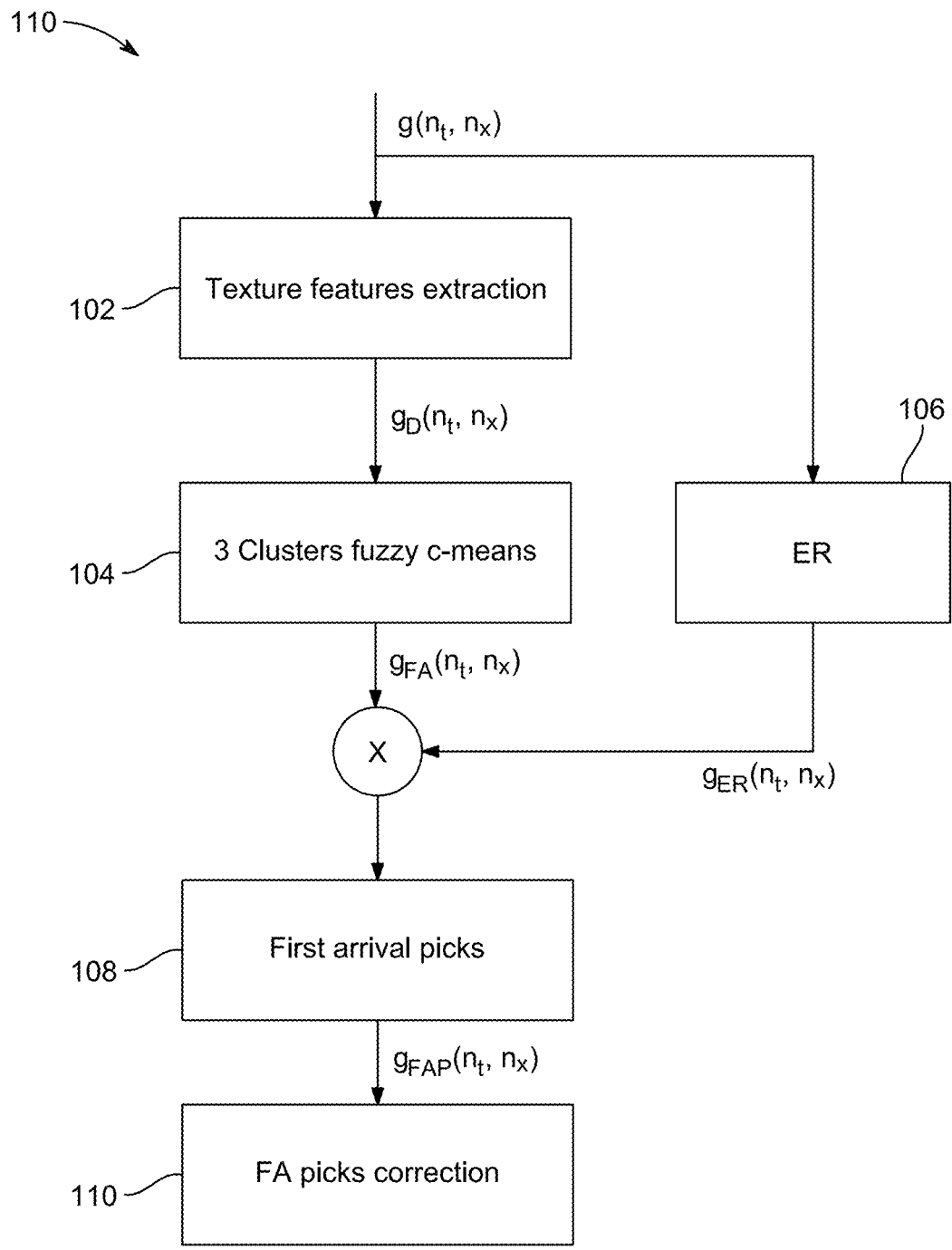
FIG. 1B depicts a flow diagram of a first arrival (FA) texture-based segmentation method, according to certain embodiments.

FIG. 1B depicts a block diagram 150 of a FA texture-based segmentation method using the processing unit 106, according to certain embodiments. More particularly, the workflow process for FA picking using the texture-derived features is shown in FIG. 1B. The workflow process includes receiving a seismic shot record data set from a seismic event. At step 152, texture features are extracted from the seismic shot record data set. In an implementation, texture features are extracted by using at least one descriptor, wherein the descriptors includes a mean, a second difference moment, a reversed second difference moment, an energy, a contrast variance, and a mode. The mean may represent the average value of the seismic signal amplitudes. The mean value provides a measure of the central tendency of the data, helping to describe the overall intensity or baseline of the seismic signal. The second difference moment is a statistical measure that involves computing the second moment of the differences between consecutive samples in the seismic signal. The second difference moment can be used to quantify the overall variability or smoothness of the signal. The reversed second difference moment is similar to the second difference moment but involves taking the second moment of the reversed (or inverted) differences between consecutive samples. The reversed second difference moment may be used to capture specific patterns or changes in the opposite direction within the seismic signal. In seismic analysis, energy refers to the total energy content of the seismic signal. The energy may be computed by summing the squared values of each sample in the signal. The energy provides information about the strength or magnitude of seismic events. The contrast variance measures the variation in amplitude or contrast between different parts of the seismic signal. The contrast variance may help identify regions with significant changes in amplitude, which may indicate geological features or subsurface structures. The mode represents the most frequently occurring value in the seismic signal. In seismic data, mode can be used to identify predominant amplitude values, potentially indicating specific geological layers or types of subsurface materials. At step 156, an energy ratio matrix is calculated from the seismic shot record data set. In an implementation, the energy ratio matrix is calculated with an industrial energy ratio procedure. At step 154, fuzzy c-means may be used to cluster the texture features into a strong linear cluster, a moderate linear cluster, and a random noise cluster. Fuzzy c-means is a clustering algorithm that belongs to the family of fuzzy clustering methods. Fuzzy clustering allows data points to belong to multiple clusters to varying degrees in contrast with conventional clustering algorithms, such as k-means, wherein each data point is assigned to only one cluster. In some examples, the fuzzy c-means may include exemplary steps such as: 1) initialize cluster centroids and membership values; 2) update membership values based on the distances between data points and centroids; 3) update centroids based on the weighted averages using membership values; and 4) repetition of the above steps until convergence (when the membership values and centroids stabilize).

At step 158, a first arrival class matrix is calculated from the moderate linear cluster. The method also includes multiplying the first arrival class matrix by the energy ratio matrix to obtain a first arrival pick matrix. At step 110, first arrival picks are corrected from the first arrival pick matrix. Three clusters are employed to record strong linear events, capture moderate linear events, and acquire random noise. A shot record extracted feature serves as a benchmark for a FA class selection. The centers of those features are arranged, and the FA segment is represented by the moderate class. The strongest class is utilized to represent the ground roll because of its significant amplitude. The third cluster serves to record random noise. The FA class is multiplied by the f after being determined. FA shot points receive high values from ER, where the ER can be computed using equation (8):

$$ER_{n_{t_d}} = \frac{\sum_{n_t=n_{td}}^{n_t+N_t} g^2(n_t, n_x)}{\sum_{n_t=1}^{n_t+N_t} g^2(n_t, n_x)}. \quad (8)$$

where $n_{t_d}$ denotes the $n_{t_a}^{th}$ sample of a trace and $g^2(n_t, n_x)$ is the corresponding energy of the sample. The resultant energy of the FA cluster is computed and multiplied by the ER to grant FA points more significance while reducing background cluster noise. Following this, the window size determines two mechanisms for selecting FA points. These mechanisms are small window and large window. For small window, the first shot points that are above a certain threshold are picked and a suggested threshold is employed for the mean of the acquired shot points. Using this, captured FA points may be of negative polarity (as a result of using ER), whereas the manual skilled expert picks the highest positive significant peaks, which necessitates shifting negative-picked spots by half of the signal period; FA correction is utilized to accomplish this. When the interval between seismic horizons is large, segmentation is improved by using large windows. This enhances the segments of linear seismic horizons and causes those events to dominate in the strongest two clusters while aggregating random noise and non-linear events. However, if a shot record is clustered using a wide window, spots with similar characteristics are also picked. To mitigate this, FA is represented by the maximum shot points in the modest cluster. Picked points correlate to FA points in this circumstance, and relocation is not required.

Figure 2A:
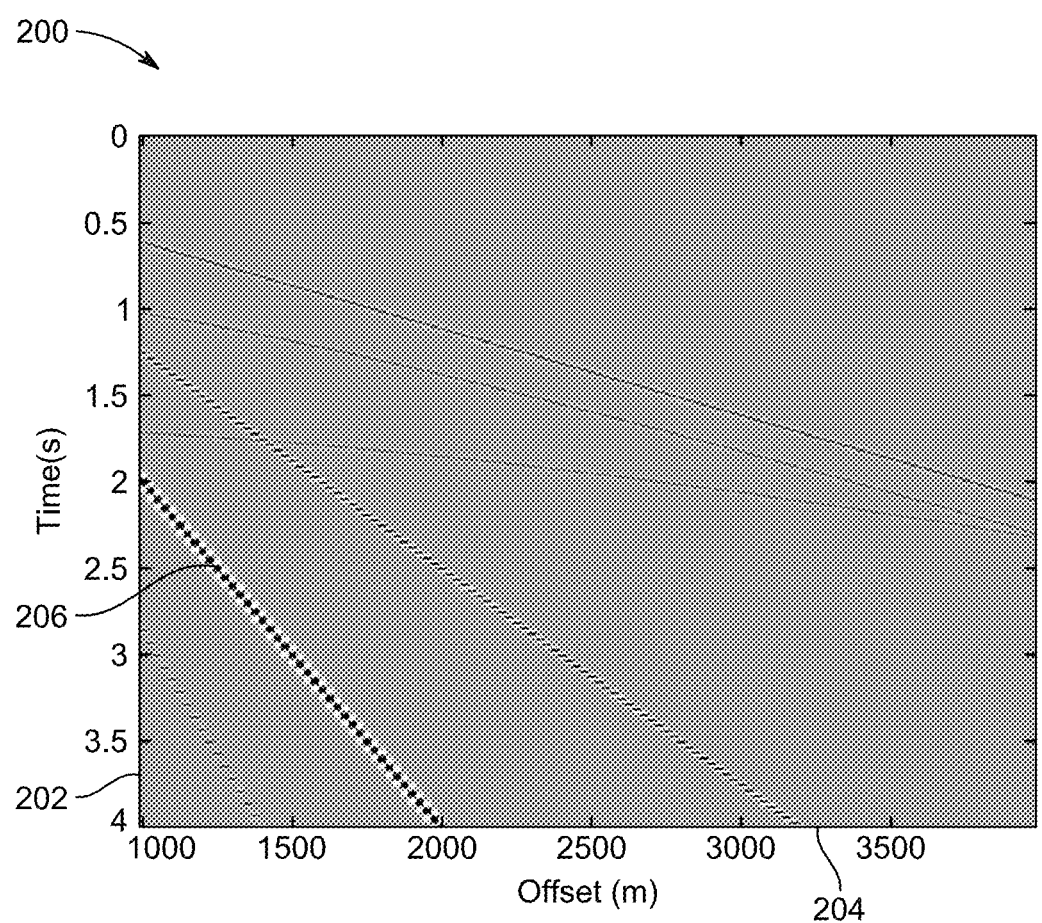
FIG. 2A depicts synthetic seismic refracted data, according to certain embodiments.

FIG. 2A depicts synthetic seismic refracted data 200, according to certain embodiments. FIG. 2A shows the plot 200 obtained by plotting time 202 along the y-axis versus offset (m) 204 along the x-axis and including curve 206. FIG. 2A displays a synthetic seismic refracted data 200 composed of 120 traces with dt=4 millisecond (ms) and dx=25 meter (m). The present method was first tested on free-noise synthetic data with a temporal sampling of dt=4 ms and a spatial sampling of dx=25 m. In addition, it was tested on the same synthetic data with additive random Gaussian noise levels of 5% and 10%. The record comprises various seismic events, including a refracted head wave, two reflections, and ground-roll noise. This data comprises 120 traces, and each trace is from 1001 time samples.

Figure 2B:
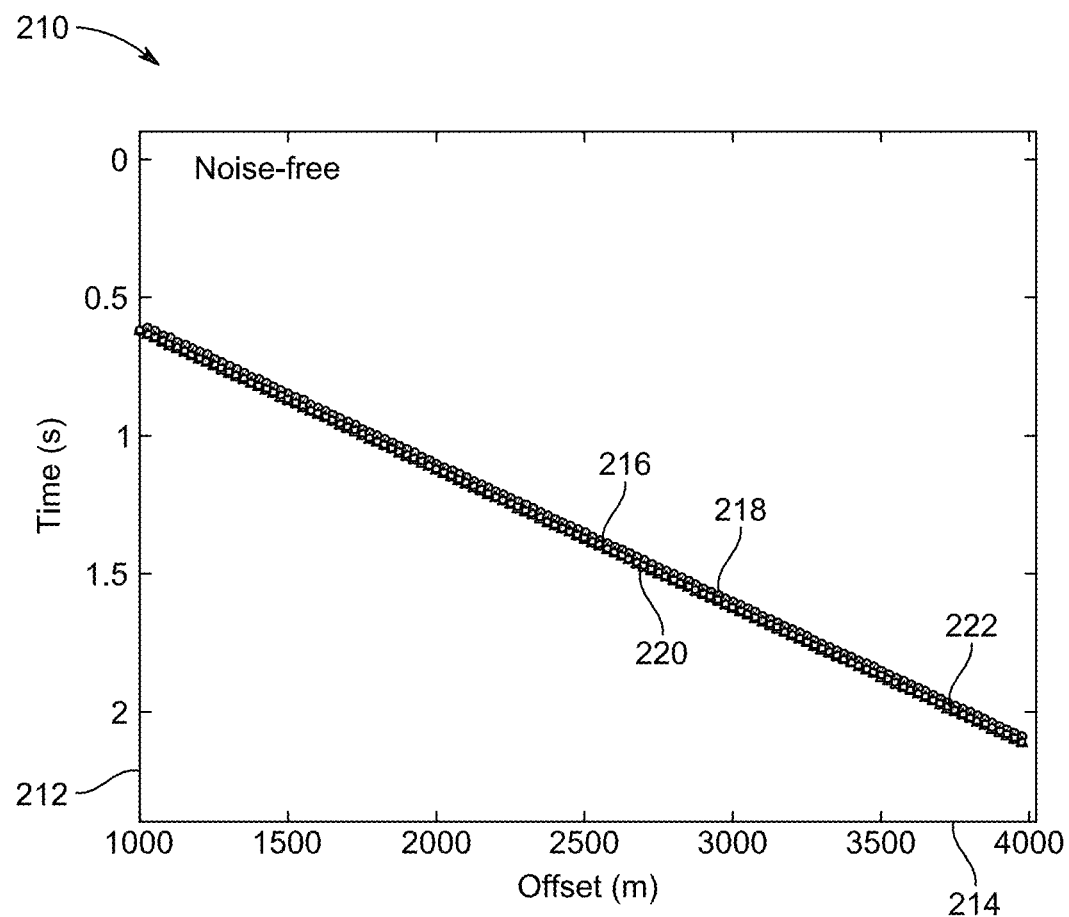
FIG. 2B depicts a first arrival pick using a texture-based segmentation (TBS) method for a synthetic shot record, according to certain embodiments.

FIG. 2B depicts first arrival picks 210 using a texture based segmentation (TBS) method for a synthetic shot record performed by the processing unit 106, according to certain embodiments. FIG. 2B depicts a comparison of first arrival picks 210 of actual picks, Coppens' method, the projection onto convex sets (POCS) method, and texture-based segmentation (TBS) method for noise-free gathering, according to certain embodiments. FIG. 2B shows the plot 210 obtained by plotting time 212 along the y-axis versus offset (m) 214 along the x-axis, including the curves of actual picks 216, Coppens' method 218, POCS method 220, and the TBS 222. FIG. 2B 210 shows the picks using the TBS method (adopting a 27×27 window) for the synthetic shot record, respectively. The picks of all the three methods were accurate for the noise-free short record.

Figure 2C:
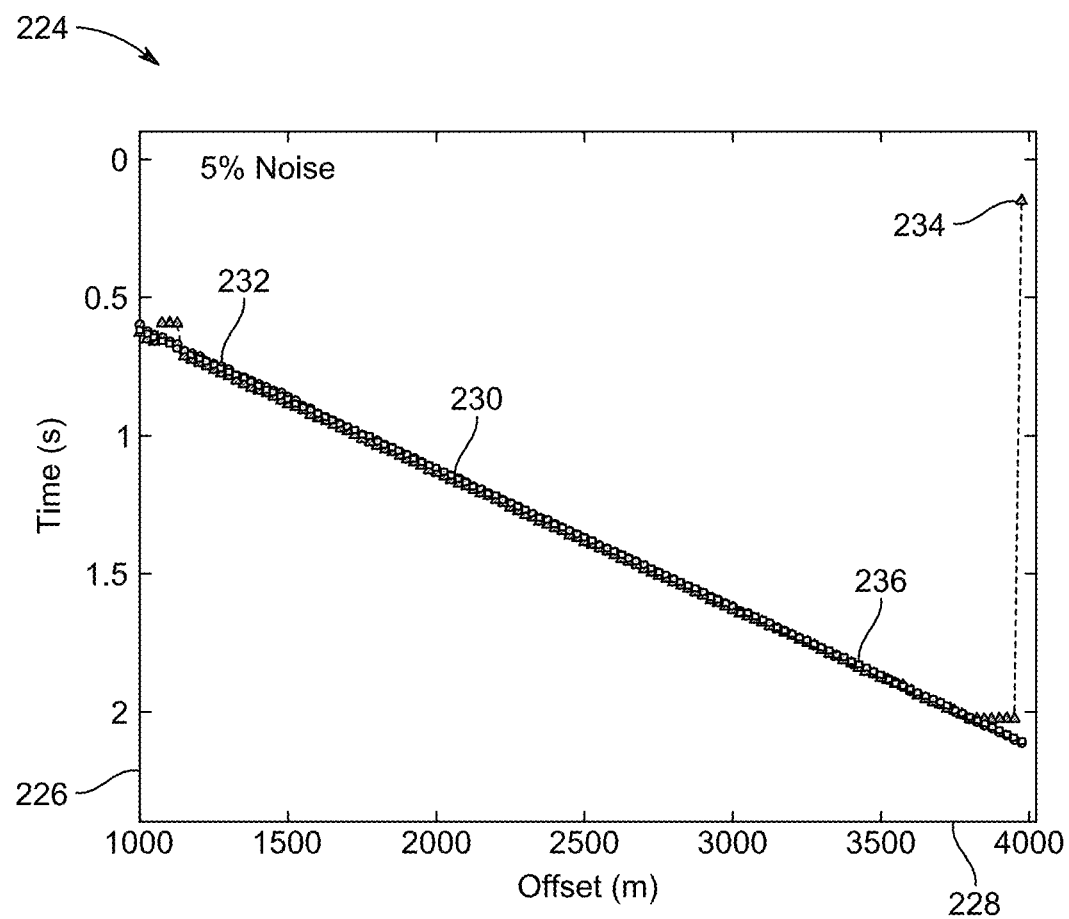
FIG. 2C-2D depicts the first arrival picks using the TBS method for a synthetic shot record, according to certain other embodiments.
Figure 2D:
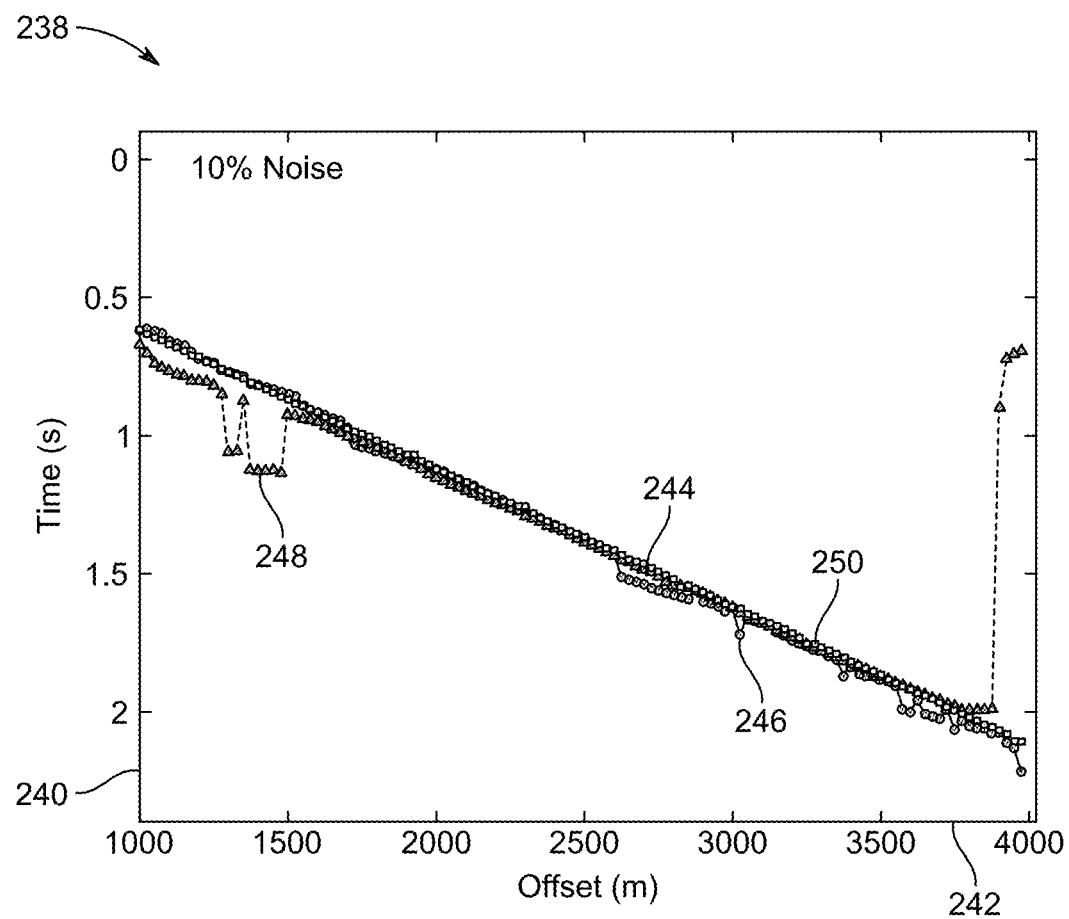

FIG. 2C-2D depict the first arrival picks 224 and 238 using the TBS method for a synthetic shot record, according to certain other embodiments. More particularly, FIG. 2C shows a plot 224 obtained by plotting time 226 along the y-axis versus offset (m) 228 along the x-axis and including the curves of actual picks 230, Coppens' method 232, POCS method 234, and TBS 236. FIG. 2C displays a comparison of first arrival picks 224 of actual picks 230, Coppens' method 232, POCS method 234, and the TBS 236 for noise-free gather with 5% random noise. FIG. 2D shows a plot 238 obtained by plotting time 240 along the y-axis versus offset (m) 242 along the x-axis and including the curves of actual picks 244, Coppens' method 246, POCS method 248, and TBS 250. FIG. 2D displays a comparison of first arrival picks 238 of actual picks 244, Coppens' method 246, POCS method 248, and TBS 250 for noise-free gather with 10% random noise. FIGS. 2C-FIG. 2D, 224, 238 show the picks using the TBS method (adopting a 27×27 window) for the synthetic shot record, respectively. However, as the noise level increased, Coppen's and POCS methods picks became inaccurate and by contrast the picks of the TBS method remain perfectly accurate. This is confirmed in Table I, where the tested methods are compared with the actual picks within an absolute error margin of ±20 ms. The TBS method outperforms the Coppen's method by more than 43% and the POCS method by more than 57%.

Figure 3A:
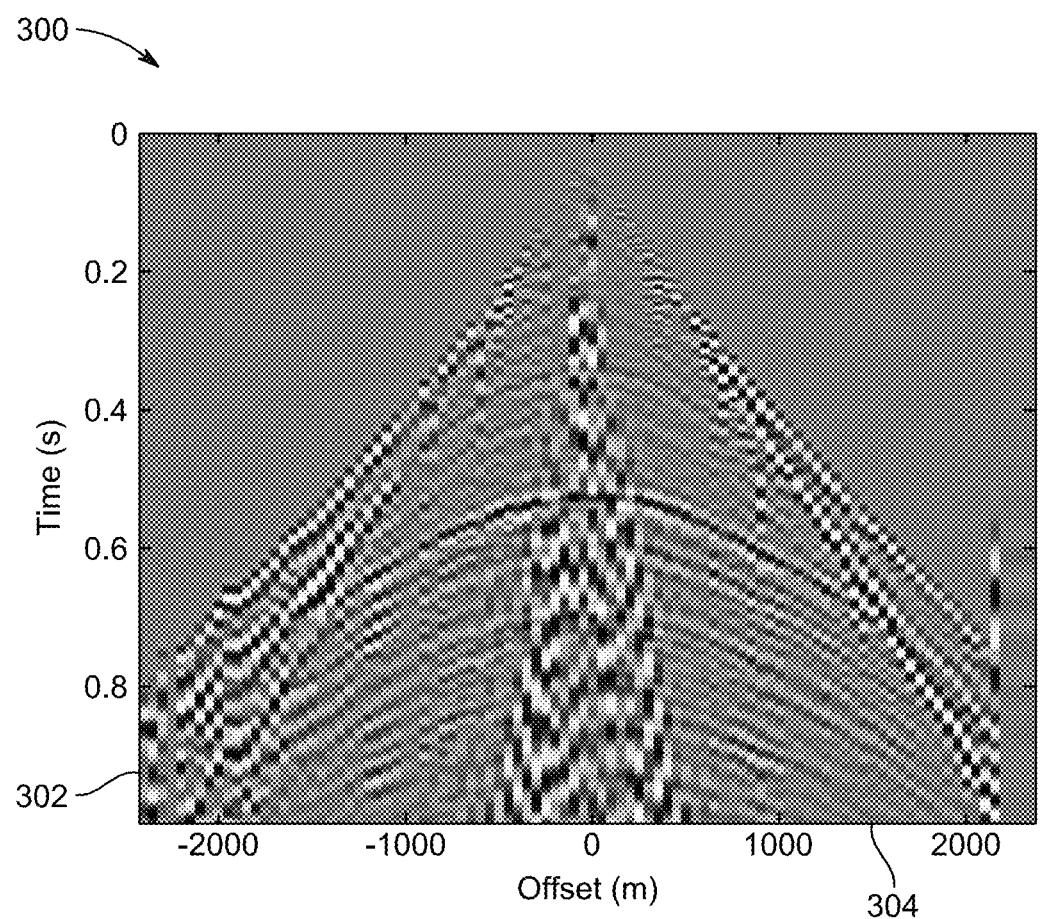
FIG. 3A depicts a real shot record number 25, according to certain embodiments.

FIG. 3A depicts a real shot 300 record number-25 with dt=2 ms and dx=50 m, according to certain embodiments. FIG. 3A shows a plot 300 obtained by plotting time 302 along the y-axis versus offset (m) 304 along the x-axis. The method was tested on two real seismic shot records. The first dataset was shot record number-25 and is shown in FIG. 3A. It consists of 96 traces; each trace is from 500-time samples, where dt=2 ms and dx=50 m, but only 1s of the data is shown. The location is in Alberta and the source was dynamite.

Figure 3B:
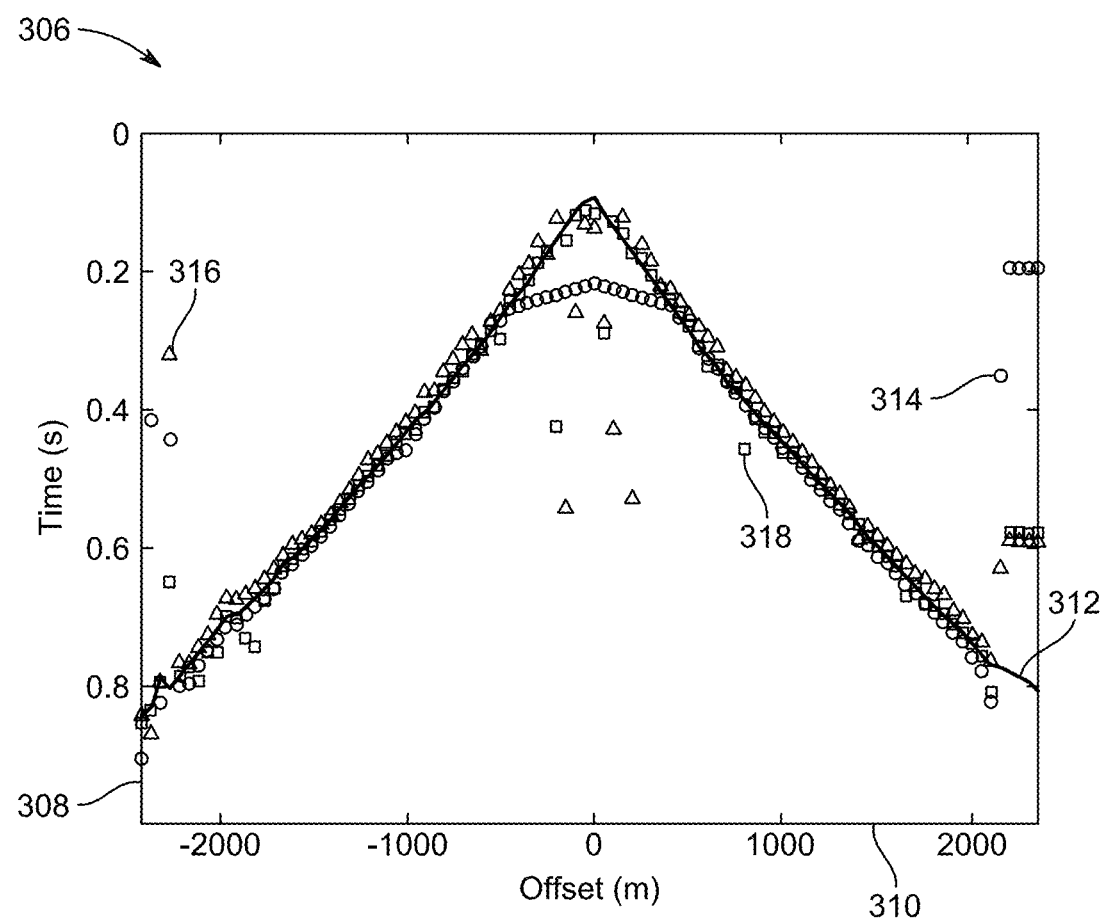
FIG. 3B depicts graphs corresponding to a comparison of the TBS picks with Coppen's and projection onto convex set (POCS) methods, according to certain embodiments.

FIG. 3B depicts 306 graphs corresponding to comparison of the TBS picks with Coppen's and projection on to convex set (POCS) methods, according to certain embodiments. FIG. 3B shows a plot 306 obtained by plotting time 308 along the y-axis versus offset (m) 310 along the x-axis, including curves of actual picks 312, Coppens' method 314, POCS method 316, and the TBS 318 method. FIG. 3B shows the FA picks 306 based on manual picking with interpolation, Coppen's method 314, POCS method 316, and the TBS method 318. FIG. 3B, shows the TBS picks compared to those of Coppen's and POCS methods. All comparisons were performed in reference to the manually picked and interpolated FA shot points determined by an experienced geophysicist. The TBS picks show an overall better accuracy than the picks of the other two methods. From Table I, the TBS picks of this shot record are 4.17% and 10.42% more accurate than the POCS method and Coppen's method picks respectively.

TABLE I

Percentage of acceptable picks within a tolerance window of ≤20 ms, with the manual picks being the reference for the real data picks using various methods shown in FIG. 3B.

| Data Name | \|True − TBS\|<br>≤20 ms | \|True − Coppen's\|<br>≤20 ms | \|True − POCS\|<br>≤20 ms |
|---|---|---|---|
| Synthetic (free noise) | 100% | 98.32% | 100% |
| Synthetic (5% noise) | 100% | 100% | 53.78% |
| Synthetic (10% noise) | 99.16% | 55.46% | 42.02% |
| Yilmaz 25 | 81.25% | 70.83% | 77.08% |
| Yilmaz 6 | 81.3% | 45.83% | 58.33% |

Figure 4A:
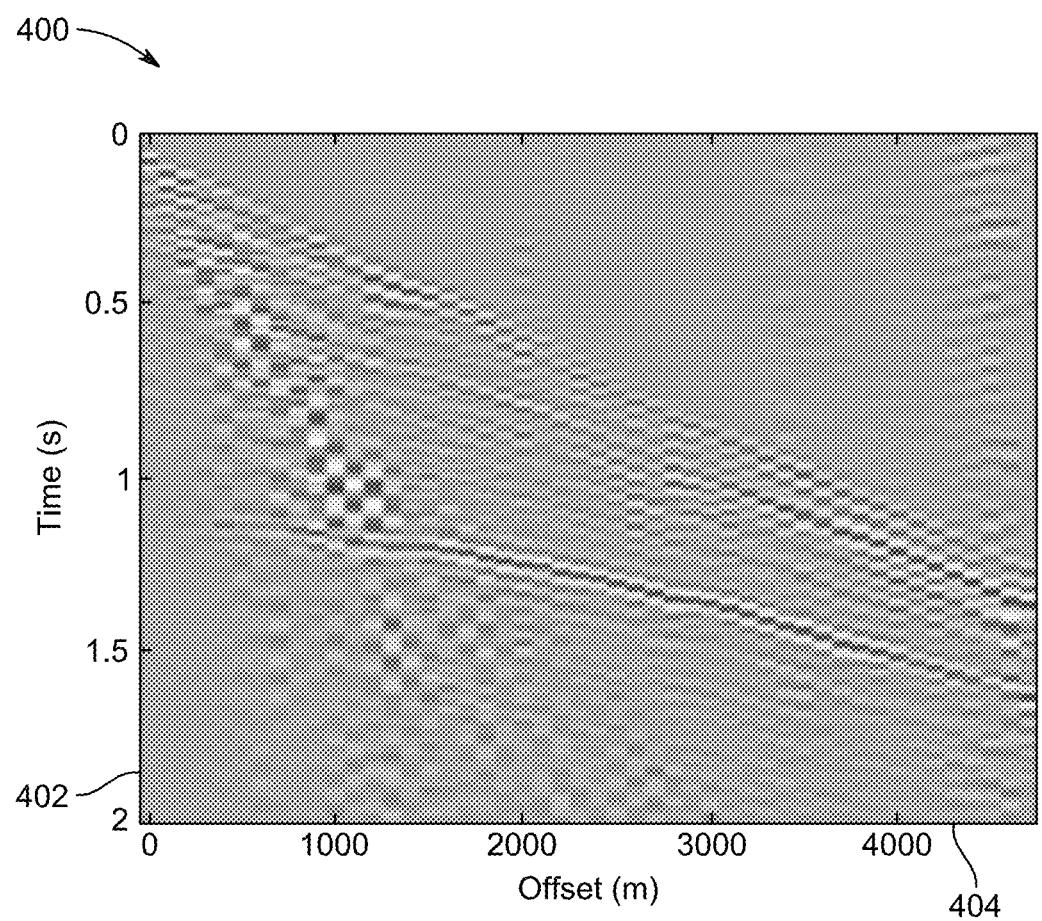
FIG. 4A depicts a real shot record number 6, according to certain embodiments.

FIG. 4A depicts a real shot 400 record number 6 with dt=4 ms and dx=100 m, according to certain embodiments. FIG. 4A shows the plot 400 obtained by plotting time 402 along the y-axis versus offset (m) 404 along the x-axis. Finally, FIG. 4A shows the second tested shot gathered from shot number 6. The data contains 48 traces, where each trace is from 500 time samples (only 2s of the data is shown), and dt=4 ms and dx=100 m. The location is in the Far East, and the source is dynamite.

Figure 4B:
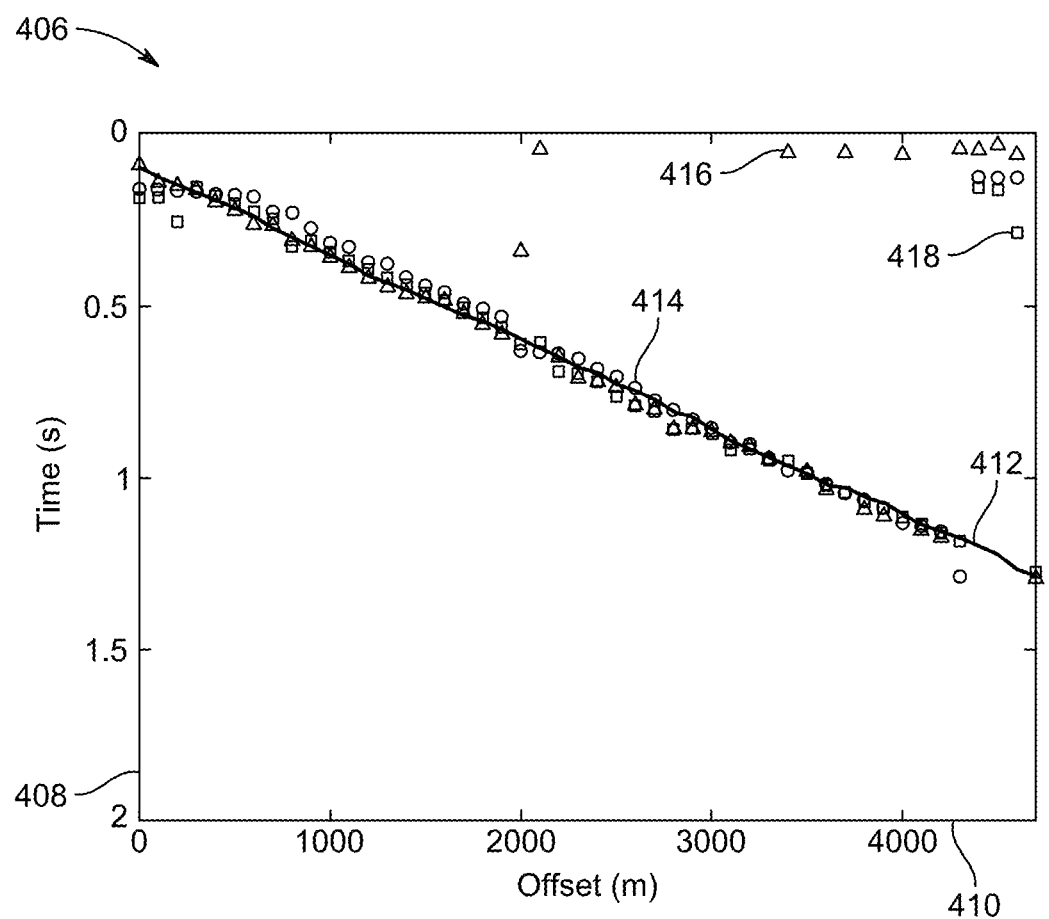
FIG. 4B depicts graphs corresponding to the picks of the three methods in comparison to the manual and interpolated picks of this shot gather, according to certain embodiments.

FIG. 4B depicts graphs corresponding to the picks of the three methods compared to the manual and interpolated picks of the shot gather, according to certain embodiments. FIG. 4B shows a plot 406 obtained by plotting time 408 along the y-axis versus offset (m) 410 along the x-axis, including the curves of actual picks 412, Coppens' method 414, POCS method 416, and the TBS 418. FIG. 4B show the FA picks 406 based on manual picking with interpolation, Coppen's method 414, POCS method 416, and the TBS method 418. FIG. 4B displays the picks of the three methods compared to the manual and interpolated picks of this shot gather. The TBS picks are more accurate than the picks of both methods by more than 29% (see Table I). Note that the performance of the data should be tested based on window size. Based on various tests, the use of larger window sizes is recommended when a wide gap exists between seismic horizons inside a single-ended spread shot record, as shown in FIG. 2A. However, if they interfere (FIG. 4A) or the geometry of raw seismic data is split spread (FIG. 3A), a narrow window of 3×3 is recommended.

Figure 5:
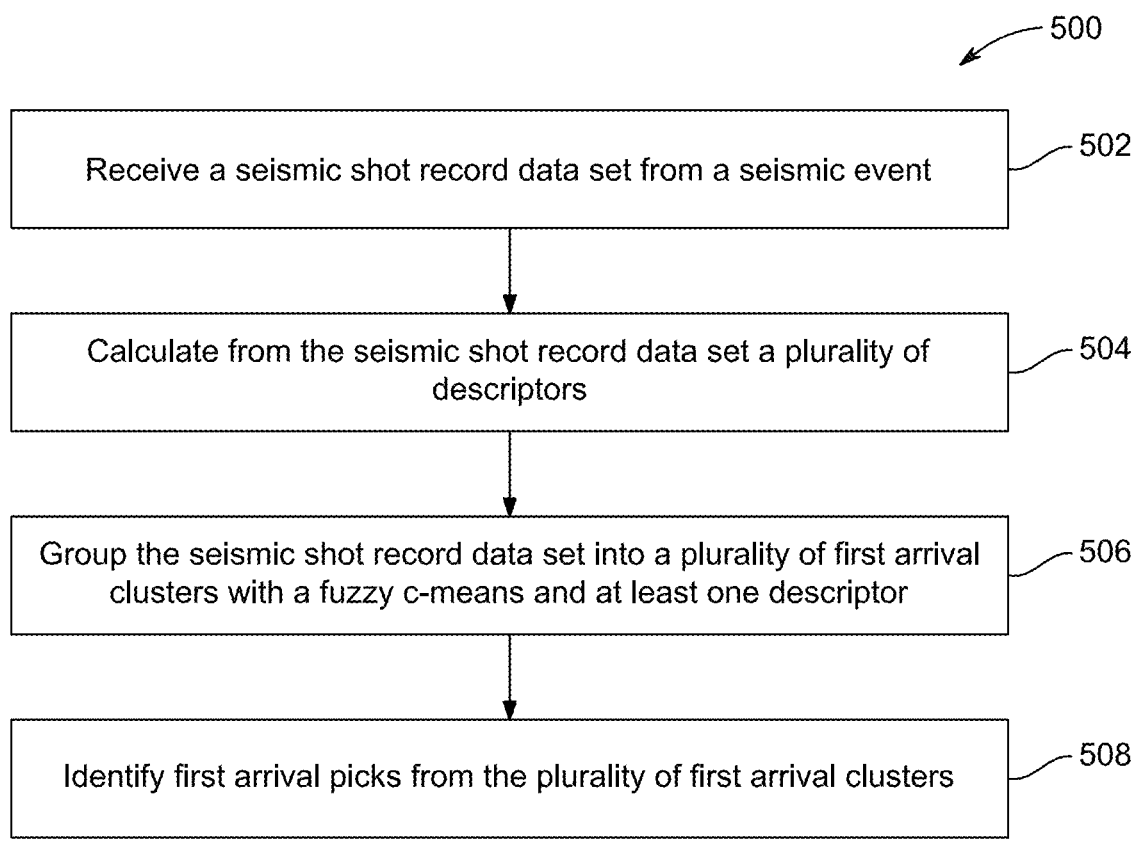
FIG. 5 depicts a flowchart of a method for the first arrival picking of seismic data, according to certain embodiments.

FIG. 5 depicts a flowchart 500 of a method for first arrival picking of seismic data, according to certain embodiments. At step 502, a seismic shot record data set is received from a seismic event. At step 504, a plurality of descriptors are calculated from the seismic shot record data set. In an implementation, the descriptors include a mean, a second difference moment, a reversed second difference moment, an energy, a contrast variance, and a mode. At step 506, the seismic shot record data set is grouped into a plurality of first arrival clusters with fuzzy c-means and at least one descriptor. In an implementation, every descriptor is used to group the seismic shot record data into a plurality of first arrival clusters. In an implementation, the descriptors are each used to calculate one column of a features matrix, the features matrix being used to group the seismic shot record data into a plurality of first arrival clusters. At step 508, first arrival picks are identified from the plurality of first arrival clusters. In an implementation, first arrival picks are identified from a plurality of enhanced first arrival clusters. In an implementation, an enhanced first arrival cluster is calculated by multiplying a first arrival cluster with an energy ratio; the energy ratio is calculated from an industrial energy ratio procedure. In an implementation, negative-picked spots of the plurality of enhanced first arrival clusters are shifted by one-half of the period of the seismic shot record data. In an implementation, the negative-picked spots of the plurality of enhanced first arrival clusters are shifted by one-half of the period of the seismic shot record when a first seismic horizon of the seismic shot record data set interferes with a second seismic horizon of the seismic shot record data set.

Figure 6:
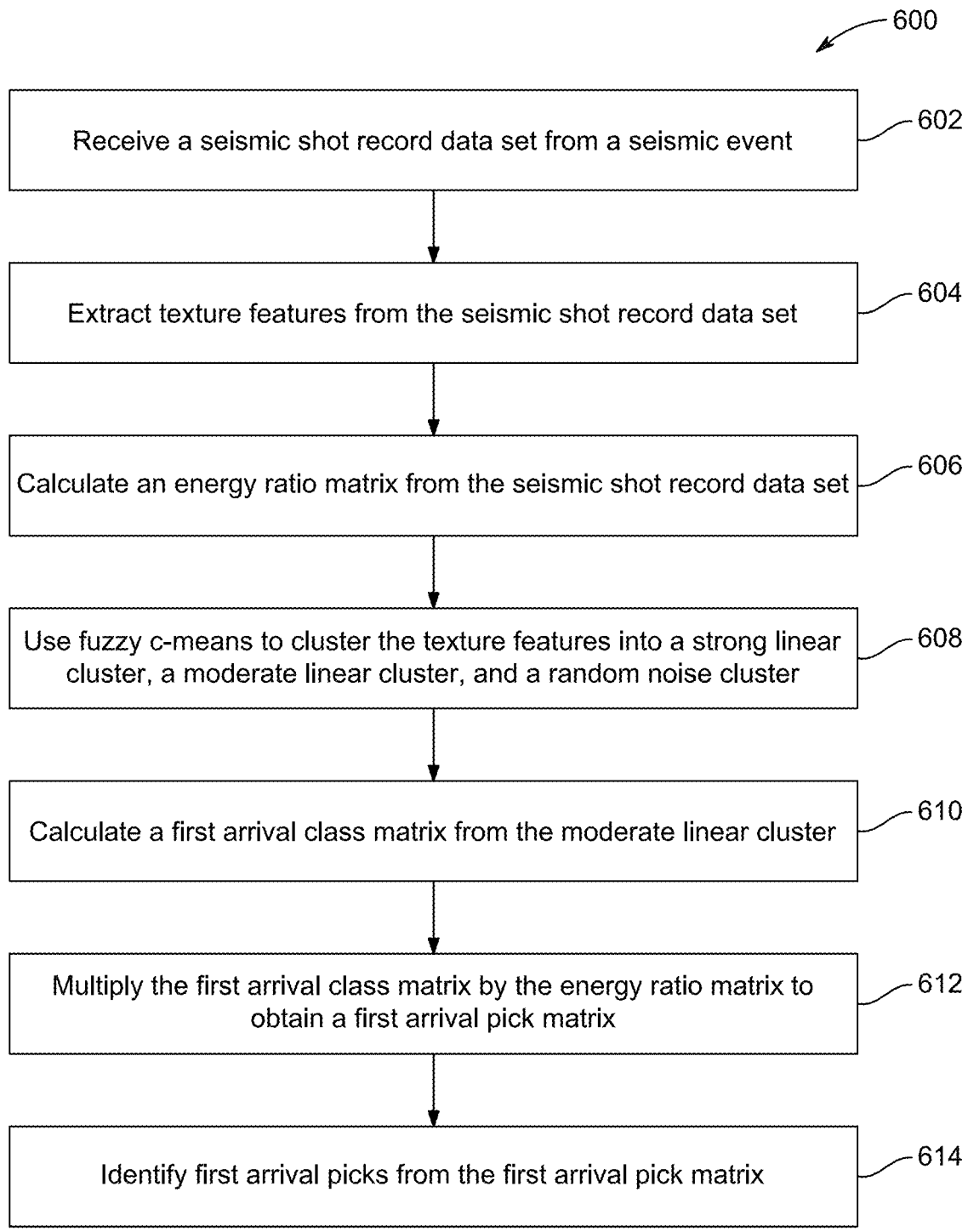
FIG. 6 depicts a flowchart of a method for the first arrival picking of seismic data, according to certain other embodiments.

FIG. 6 depicts a flowchart 600 of a method for the first arrival picking of seismic data, according to certain other embodiments. At step 602, a seismic shot record data set is received from a seismic event. At step 604, texture features are extracted from the seismic shot record data set. In an implementation, texture features are extracted using at least one descriptor, wherein the descriptors include a mean, a second difference moment, a reversed second difference moment, an energy, a contrast variance, and a mode. In an implementation, every descriptor is used to group the seismic shot record data into a plurality of first arrival clusters. In an implementation, the descriptors are each used to calculate one column of a features matrix, the features matrix being used to cluster the texture features. At step 606, an energy ratio matrix is calculated from the seismic shot record data set. In an implementation, the energy ratio matrix is calculated using an industrial energy ratio procedure. At step 608, fuzzy c-means are used to cluster the texture features into a robust linear cluster, a moderate linear cluster, and a random noise cluster. At step 610, a first arrival class matrix is calculated from the moderate linear cluster. At step 612, the first arrival class matrix is multiplied by the energy ratio matrix to obtain a first arrival pick matrix. At step 614, the first arrival picks are identified from the first arrival pick matrix. In an implementation, negative-picked spots of the first arrival pick matrix are shifted by one-half of the period of the seismic shot record data. In an implementation, the negative-picked spots of the first arrival pick matrix are shifted by one-half of the period of the seismic shot record when a first seismic horizon of the seismic shot record data set interferes with a second seismic horizon of the seismic shot record data set.

Figure 7:
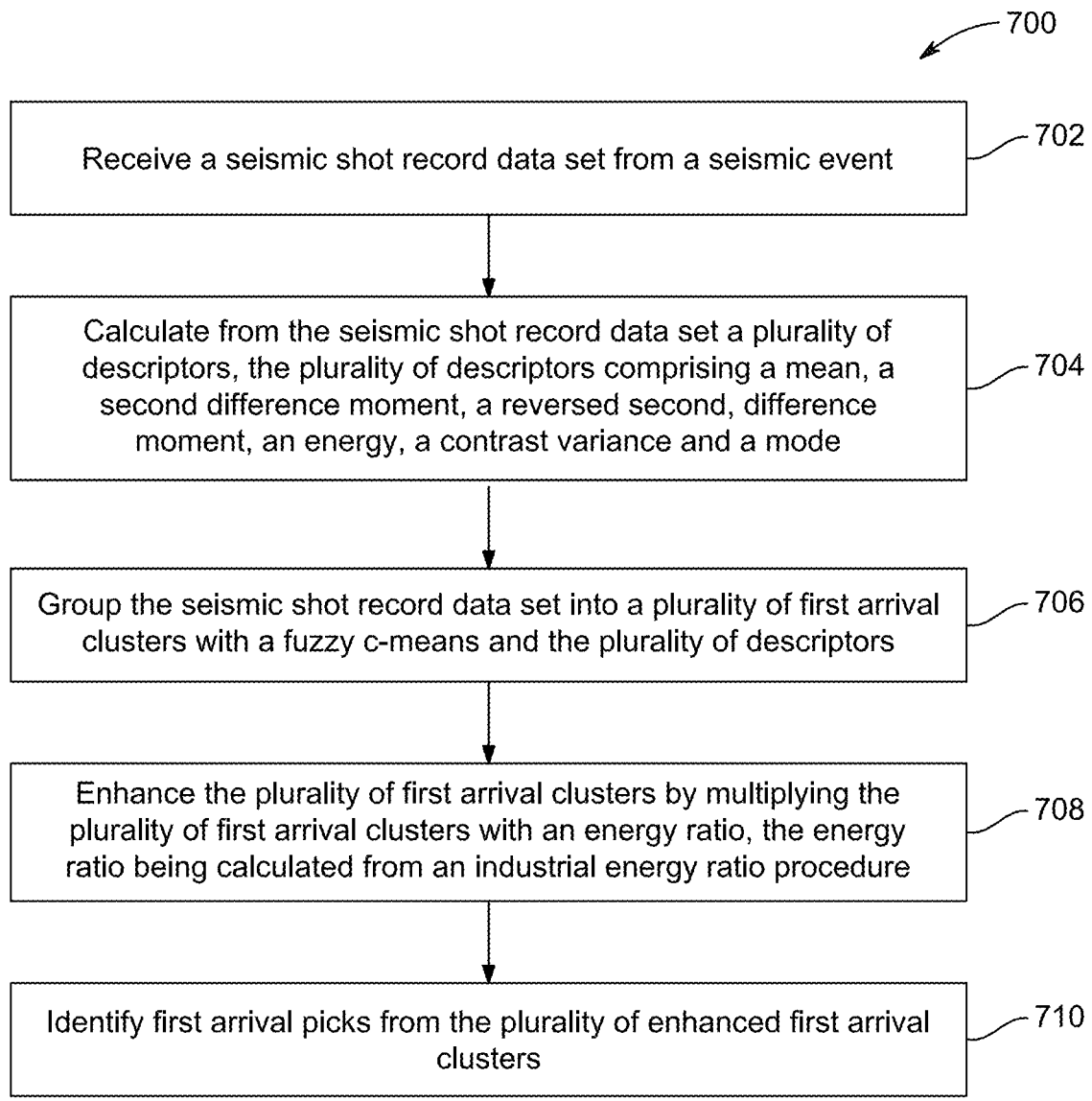
FIG. 7 depicts a flowchart of a method for the first arrival picking of seismic data, according to certain other embodiments.

FIG. 7 depicts a flowchart 700 of a method for first arrival picking of seismic data, according to certain other embodiments. At step 702, a seismic shot record data set is received from a seismic event. At step 704, a plurality of descriptors are calculated from the seismic shot record data set. The plurality of descriptors includes a mean, a second difference moment, a reversed second difference moment, an energy, a contrast variance, and a mode. At step 706, the seismic shot record data set is grouped into a plurality of first arrival clusters with a fuzzy c-means and the plurality of descriptors. At step 708, the plurality of first arrival clusters is enhanced by multiplying the plurality of first arrival clusters with an energy ratio, the energy ratio is calculated from an industrial energy ratio procedure. At step 710, first arrival picks are identified from the plurality of enhanced first arrival clusters. In an implementation, the energy ratio matrix is calculated using an industrial energy ratio procedure. In an implementation, the descriptors are each used to calculate one column of a features matrix, the features matrix being used to group the seismic shot record data into a plurality of first arrival clusters. In an implementation, negative-picked spots of the plurality of enhanced first arrival clusters are shifted by one-half of the period of the seismic shot record data. In an implementation, the negative-picked spots of the plurality of enhanced first arrival clusters are shifted by one-half of the period of the seismic shot record when a first seismic horizon of the seismic shot record data set interferes with a second seismic horizon of the seismic shot record data set.

The present technology provides an innovative first arrival picking technique based on texture segmentation of seismic shot records for exploring seismic data. The seismic shot records are divided into clusters (depending on the seismic event types) based on texture-extracted features and fuzzy c-means. This technique utilizes the industrial energy ratio procedure to be conducted before clustering and applied to the cluster containing the first arrivals to recognize seismic shot points corresponding to the direct arrival picks. The procedure was tested on one synthetic and two real seismic shot records. Using the present technique, a pick accuracy of more than 99% was achieved for the synthetic data set with a noise level of 10%, and more than 80% accuracy was achieved for the real data shot records, and all tests were within an absolute error tolerance of ±20 ms. Additionally, the present technique picks were more accurate than the picks of the standard industrial Coppen's method as well as the projection onto convex sets segmentation technique by an overall average accuracy of approximately 28.98%. For first-arrival picking of seismic energy, a novel approach was presented based on texture segmentation. The mean, energy, SDM, RSDM, mode, and contrast variance were identified as statistical features utilized for seismic image segmentation. Various synthetic and real shot records were utilized to validate the suggested technique picks accuracy. The method provides a competitiveness in capturing FA picks with an approximately 28.98% higher overall average accuracy than those of the standard industrial Coppen's method and reported POCS segmentation technique. The present disclosure provides a direction for automatic picking for exploring seismic shot records via texture segmentation and sets bases for other emerging algorithms such as deep learning to address such an important seismic data processing step.

The first arrival picking technique of the present invention may improve the first arrival picking process such that seismic data processing is faster and more accurate. An increase in the accuracy and speed of seismic data processing may improve the accuracy of geologic models, and reduce the time needed to create geological models. Geological models may be two-dimensional or three-dimensional representations of portions of the Earth's crust based on geophysical and geological observations made through the collection and processing of seismic data. Geological models may provide information about the physical properties of the Earth's crust at all points described in the model which may allow for the drilling of hydrocarbon wells which are more productive by identifying large and accessible oil deposits. Geological modeling may also improve the process of drilling oil and/or gas wells by increasing the safety and speed of the drilling process by allowing for the identification of geological formations which may impede the passage and stability of a drill passing through them or may be particularly easy to drill through.

Geological models may also be used to locate other subterranean natural resources such as coal or natural gas and may improve the safety and speed of drilling or mining for other natural resources and/or fossil fuels. An increase in the processing speed and accuracy of the first arrival picking of seismic data may therefore improve the art of geological modeling which will lead to an increase in the speed and safety with which new, highly productive oil wells may be drilled or other natural resources may be harvested from the Earth's crust.

In the present disclosure, drilling an oil well may include one or more steps such as identifying a drill or rig site (for example a point on the surface of the Earth to initiate drilling into the Earth to form a bore hole to a subterranean geologic formation). The first picking of the present disclosure may be used to identify one or more portions or points of a hydrocarbon-bearing geologic formation at which a test borehole or production borehole has the greatest likelihood of accessing liquid or gaseous hydrocarbons. First picking may also help identify upheavals or points of the subterranean geologic formation that are closest to the surface of the Earth and thus most easily accessible by drilling, for example requiring less production tubing and/or less drill time to access.

First picking may also be used to identify and select an inclination angle for supplemental drilling at an existing borehole and/or to identify a subterranean geological formation having the greatest likelihood of effective and economical production of hydrocarbons from one or more lateral wells. First picking may also be used to identify wells for fracking and specifically to identify subterranean production zones, e.g., zones for initiating fracking, laterally or horizontally within a single geologic formation or in unconnected formations. First picking may also help identify strata through which a borehole must pass which must be selectively or exclusively cemented or sealed from production tubing.

Numerous modifications and variations of the present disclosure are possible in light of the above teachings. It is therefore to be understood that within the scope of the appended claims, the invention may be practiced otherwise than as specifically described herein.

The invention claimed is:

1. A method for locating a hydrocarbon-bearing geologic formation and drilling a hydrocarbon well with first arrival picking of seismic data, comprising:
    by a seismic wave generator arranged at a first position on an Earth surface, generating seismic shot waves, and transmitting the seismic shot waves from the Earth surface into an Earth subsurface;
    by a seismic receiver arranged at a second position on the Earth surface, sensing seismic signals from seismic events caused in the Earth subsurface by the seismic shot waves, to obtain a seismic shot record data set;
    by a data processing unit,
        processing the seismic shot record data set to identify first arrival picks associated with the seismic events, and
        using a geological model determined based on the first arrival picks, identifying a hydrocarbon-bearing geologic formation containing a subterranean hydrocarbon resource and a drill point of the subterranean hydrocarbon resource, where the geological model provides a three-dimensional representation of the Earth subsurface in vicinity of the first position; and
    by a drilling unit, drilling a hydrocarbon well at the identified drill point,
    wherein the step of processing the seismic shot record data set further comprises:
        calculating from the seismic shot record data set a plurality of descriptors,
        grouping the seismic shot record data set into a plurality of first arrival clusters with a fuzzy c-means and at least one descriptor, and
        identifying the first arrival picks from the plurality of first arrival clusters; and
    extracting oil and/or gas from the subterranean hydrocarbon resource.

2. The method of claim 1, wherein the descriptors comprise:
    a mean;
    a second difference moment;
    a reversed second difference moment;
    an energy;
    a contrast variance; and
    a mode.

3. The method of claim 2, wherein every descriptor is used to group the seismic shot record data into a plurality of first arrival clusters.

4. The method of claim 3, wherein the descriptors are each used to calculate one column of a features matrix, the features matrix being used to group the seismic shot record data into a plurality of first arrival clusters.

5. The method of claim 1, wherein an enhanced first arrival cluster is calculated by multiplying a first arrival cluster with an energy ratio, the energy ratio being calculated from an industrial energy ratio procedure.

6. The method of claim 5, wherein first arrival picks are identified from a plurality of enhanced first arrival clusters.

7. The method of claim 6, wherein negative-picked spots of the plurality of enhanced first arrival clusters are shifted by one half of the period of the seismic shot record data.

8. The method of claim 6, wherein the negative-picked spots of the plurality of enhanced first arrival clusters are shifted by one half of the period of the seismic shot record when a first seismic horizon of the seismic shot record data set interferes with a second seismic horizon of the seismic shot record data set.

* * * * *